United States Patent [19]
Bar-David

[11] Patent Number: 5,365,185
[45] Date of Patent: Nov. 15, 1994

[54] FREQUENCY CONTROLLED LOOP FOR DEMODULATING OOK AND PSK SIGNALS

[75] Inventor: Israel Bar-David, Haifa, Israel

[73] Assignee: Technion Research & Development Foundation, Haifa, Israel

[21] Appl. No.: 100,602

[22] Filed: Jul. 30, 1993

[30] Foreign Application Priority Data

Aug. 5, 1992 [IL] Israel .................................... 102737

[51] Int. Cl.$^5$ ............................................ H04L 27/22
[52] U.S. Cl. .................................... 329/308; 329/311; 331/12; 375/81; 375/120
[58] Field of Search .............. 329/308, 309, 311; 331/12; 375/81, 83, 86, 87, 94, 120

[56] References Cited

U.S. PATENT DOCUMENTS 3,768,030 10/1973 Brown et al. ......................... 331/12
5,062,123 10/1991 Geile et al. ............................ 375/81

Primary Examiner—Siegfried H. Grimm
Attorney, Agent, or Firm—Bernard A. Reiter

[57] ABSTRACT

A method and apparatus for producing a frequency-controlled loop in a phase-diversity receiver for demodulating received ON-OFF-keyed (OOK) and phase shift keying (PSK) signals, by feeding a reference frequency signal and the received signals to a quadrature mixer (QM) which produces two output signals in phase quadrature at nominally zero intermediate frequency. Quadrature continuous wave signals void of the modulation are produced from the phase quadrature output signals. A voltage proportional to the frequency of the quadrature continuous wave signals is generated and is utilized for controlling the frequency of the generated reference frequency signal.

18 Claims, 3 Drawing Sheets

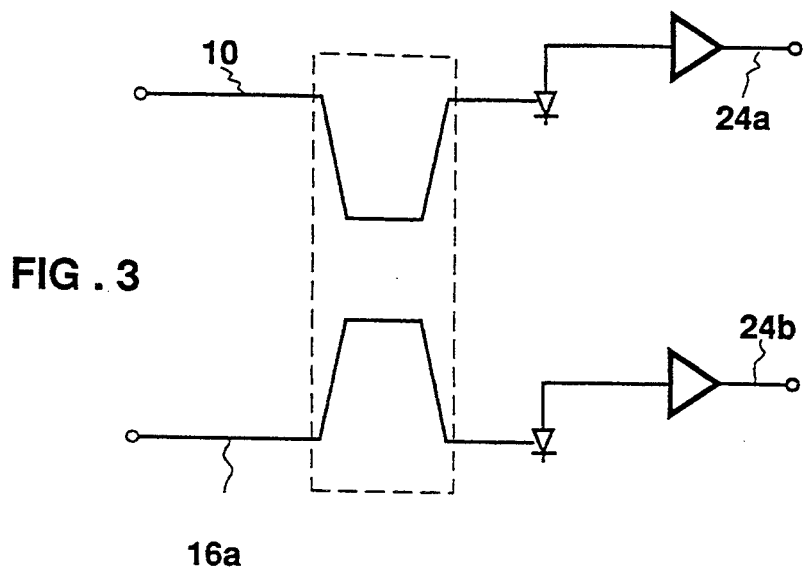
FIG. 3
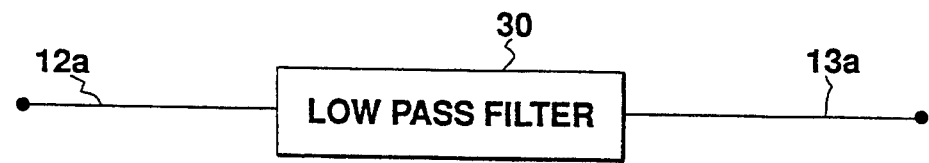
FIG. 4
FIG. 7
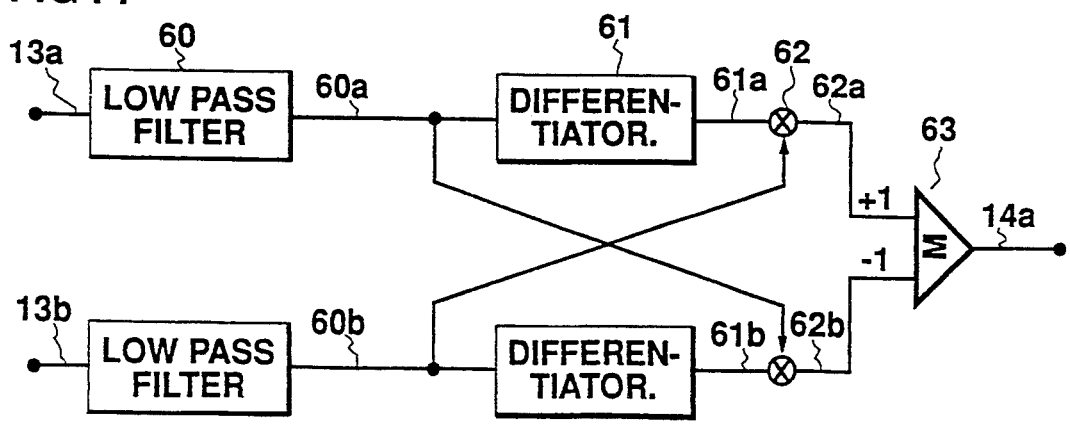

FREQUENCY CONTROLLED LOOP FOR DEMODULATING OOK AND PSK SIGNALS

FIELD AND BACKGROUND OF THE INVENTION

The present invention relates to the demodulation of digital ON-OFF-keyed (OOK) and phase shift keying (PSK) signals, and particularly to a method and apparatus for producing a zero-valued intermediate frequency (IF) by a frequency-controlled loop in a phase-diversity receiver for demodulating received OOK and PSK signals.

Establishing a coherent reference signal is a crucial requirement in homodyne FM receivers. With relatively stable frequency sources this can be achieved by locking one phase of a local oscillator to the phase of the signal carrier—or if modulation is such that the carrier is not suppressed, to that of the virtual carrier. When local oscillators are not sufficiently stable for such phase-locking, the technique of phase-diversity reception is often used; for then, only the frequency of the local oscillator need be controlled, and diversity combining is effectuated in order to compensate for the lack of phase coherence.

BRIEF SUMMARY OF THE INVENTION

According to one aspect of the present invention, there is provided a method of producing a frequency-controlled loop in a phase-diversity receiver for demodulating received ON-OFF-keyed (OOK) and phase shift keying (PSK) signals, comprising the following operations:

(a) generating a reference frequency signal;
(b) feeding the reference frequency signal and the received signals to a quadrature mixer (QM) which produces two output signals in phase quadrature at normally zero intermediate frequency;
(c) producing from said phase quadrature output signals, quadrature continuous wave signals void of the modulation;
(d) generating a voltage proportional to the frequency of the quadrature continuous wave signals;
(e) and utilizing said generated voltage for controlling the frequency of the reference frequency signal generated in operation (a).

According to one described embodiment, the received signals are OOK signals; and the above-described operation (c) is performed by passing the phase quadrature signals produced in operation (b) through a pair of low-pass filters.

According to a second described embodiment, the received signals are binary phase shift keying (BPSK) signals; and operation (c) is performed by a base-band-frequency-doubler (BBFD) circuit which transforms the BPSK signals into two pure continuous wave signals in quadrature relationship.

According to a further described embodiment, the received signals are quaternary phase shift keying (QPSK) signals; and operation (c) is performed by a first base-band-frequency-doubler (BBFD) circuit which transforms the QPSK signals into binary phase shift keying (BPSK) signals, and then by a second BBFD circuit which transforms the BPSK signals into two pure continuous wave signals in quadrature relationship.

According to further features in the described embodiments, operation (d) is performed by a base-band-frequency-discriminator (BBD) circuit which, when fed with the two pure continuous wave signals in quadrature relationship, outputs a voltage proportional to their frequency.

According to still further features in the described embodiments, before operation (e) is performed, the voltage outputted by operation (d) is passed through a loop filter that smoothes out the output of operation (d).

The invention also provides apparatus for producing a frequency-controlled loop in a phase-diversity receiver for demodulating received ON-OFF-keyed (OOK) and phase shift keying (PSK) signals in accordance with the above method.

As will be described more particularly below, the method and apparatus of the present invention enable the control of a local oscillator such that its frequency will be exactly at the frequency of the carrier in an ON-OFF-keyed (OOK) or of the suppressed carrier in a phase-shifted-keyed (PSK) signal; that is, such that the intermediate frequency (IF) is nominally zero. Previous art receivers for OOK or PSK signals allow for an "offset" IF in order to effectuate local oscillator control. However, it is well known and documented that offset IF causes degradation in performance, particularly by increasing the damage inflicted by laser phase noise.

The described method and apparatus can be cascaded with a conventional diversity combining technique that is comprised of signal detection in each of the two quadrature diversity branches at the output of the QM and post-detection addition of the detected signals. Alternatively, it can be cascaded by a base-band phase equalizer (BBPE) identical to the one described in my patent application Ser. No. 07/883,312 filed May 14, 1992 and now U.S. Pat. No. 5,235,290..

Further features and advantages of the invention will be apparent from the description below.

BRIEF DESCRIPTION OF THE DRAWINGS

The invention is herein described, by way of example only, with reference to the accompanying drawings, wherein:

FIG. 3 illustrates a quadrature mixer (QM) based on a 90° hybrid;

FIG. 4 illustrates a modulation wipe-off (MWO) circuit which is appropriate for OOK signals as composed of two independent low-pass filters;

FIG. 7 illustrates a baseband discriminator (BBD) circuit that may be used in the described system.

DESCRIPTION OF PREFERRED EMBODIMENTS

Figure 1:
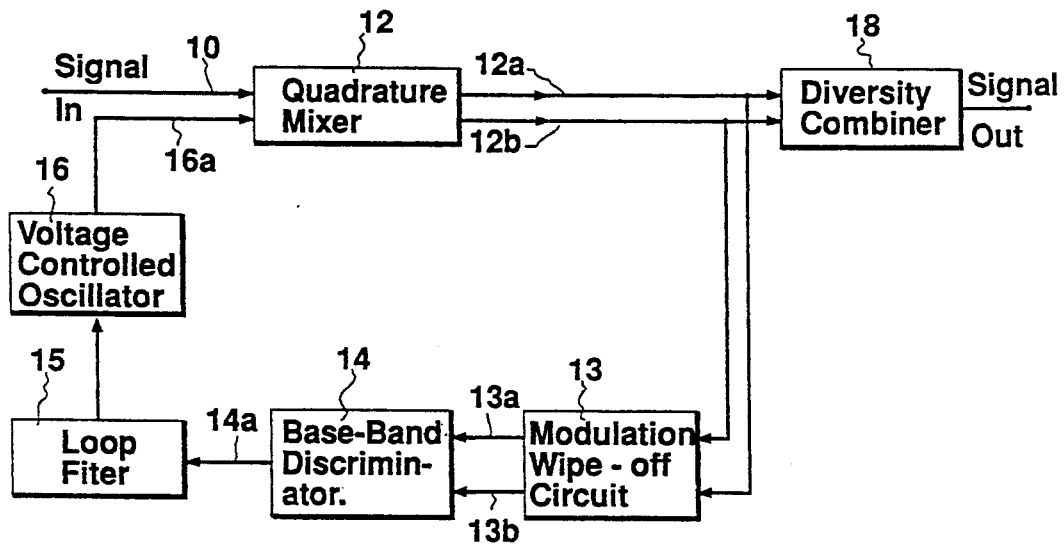
FIG. 1 illustrates a receiver constructed in accordance with the invention, in which a Zero IF control loop includes a voltage controlled oscillator (VCO), a quadrature mixer (QM), a modulation wipe-off circuit (MWO), a baseband discriminator (BBD) and a loop filter. A Diversity Combiner combines the diversity signals that appear at the QM output branches.

FIG. 1 illustrates a receiver configuration which differs from other receiver structures (such as the intradyne and the phase-diversity receivers), in that its component parts are such that the nominal frequency of the VCO 16 will be equal to the frequency of the carrier of the input signal 10 when the latter is an OOK signal, or to the frequency of the suppressed carrier when PSK is used; i.e. the intermediate frequency (IF) is nominally zero.

As shown in FIG. 1, the QM quadrature outputs 12a and 12b are inputted into the Modulation Wipe-Off (MWO) circuit; this circuit is described by FIGS. 3 and 4 for the OOK and PSK cases, respectively. The operation of this circuit is as its name implies: its outputs 13a and 13b are quadrature continuous wave (CW) signals and are void of the modulating terms, which would hamper the proper operation of the following Base Band Discriminator (BBD) circuit 14. The frequency of the outputted CW signals is directly related to the input signals 12a and 12b, respectively.

The BBD circuit is a conventional circuit which generates a voltage 14a that is proportional to the frequency of the quadrature CW's outputted at 13a and 13b. The generated voltage is passed through a conventional loop filter (LF) 15 and controls the frequency of the VCO 16, thus closing the zero-IF control loop of the receiver.

Figure 2:
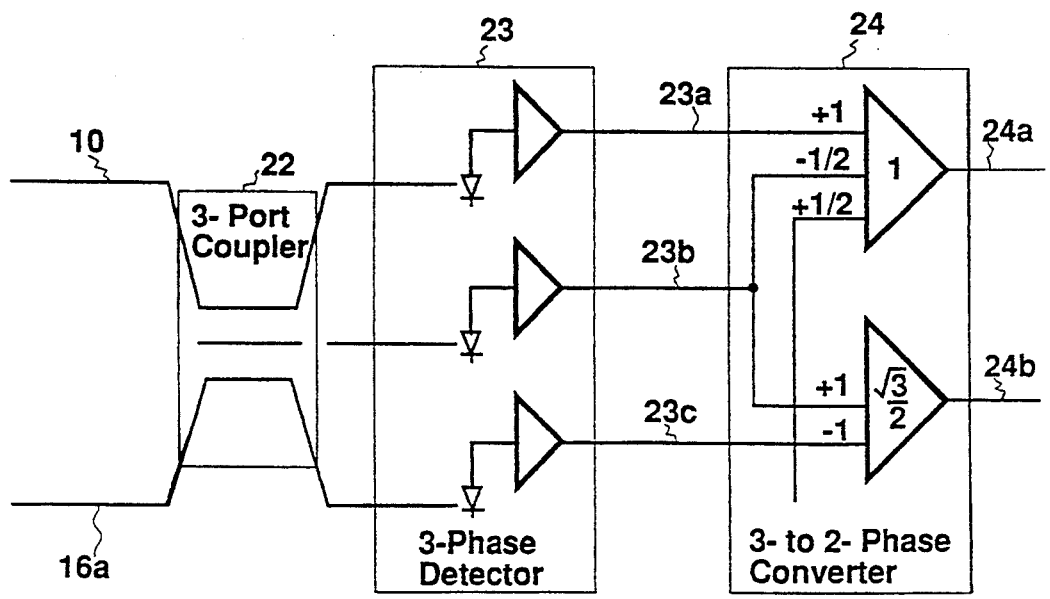
FIG. 2 illustrates a conventional quadrature mixer (QM) in a symmetrical three-port coupler configuration that includes a three-to-two phase linear transforming network.

FIG. 2 illustrates a quadrature mixer (QM) of known configuration, based on a three-port symmetrical coupler. When the coupler is inputted by two signals 10 and 16a, it outputs three mixed signals. The latter signals are detected by a three-phase detector 23 which generates a three-phase IF signal 23a, b, and c, spaced 120° apart with respect to each other. In the preferred embodiment illustrated in FIG. 2, the three-phase signal is passed through the three-to-two phase converter 24, the two outputs 24a and 24b of which are in phase-quadrature at the IF. This is the justification in designating the entire block 12 as a "quadrature" mixer (QM).

Another embodiment of the QM 12, as illustrated in FIG. 3, uses a 90° hybrid coupler—instead of the three-port coupler—which has only two output ports feeding a two-phase detector and thus leading directly into quadrature outputs, such as 24a and 24b. Such an embodiment, superficially simpler, depends on the availability of a 90° hybrid coupler, which is however difficult to produce at lightwaves (LW). Thus, the FIG. 2 circuit is preferable for LW, whereas the FIG. 3 circuit would be considered for microwaves ($\mu$W).

FIG. 4 illustrates an MWO circuit for amplitude phase keying (APK) particularly ON-OFF-keying (OOK). OOK signals on input lines 12a and 12b can be described by the pair of functions $$12a: a_k \cos(\omega_I t + \theta) \quad (1)$$

$$k = \ldots, -1, 0, 1, 2$$

$$12b: a_k \sin(\omega_I t + \theta) \quad (2)$$

with $a_k$ changing between 0 and some positive value, say A, at the keying rate. The low pass filters 30 smooth the variations in $a_k$ such that the outputs 13a and 13b become:

$$\bar{a} \cos(\omega_I + \tau) \quad (3)$$

$$\bar{a} \sin(\omega_I + \tau) \quad (4)$$

where a is a mean value between 0 and A, depending on the keying duty ratio. Here $\omega_I$ is the residual IF frequency and $\theta$ and $\tau$ are phase angles that depend on the circuit parameter and may take on any value, as far as operation of the frequency loop is concerned.

Figure 5:
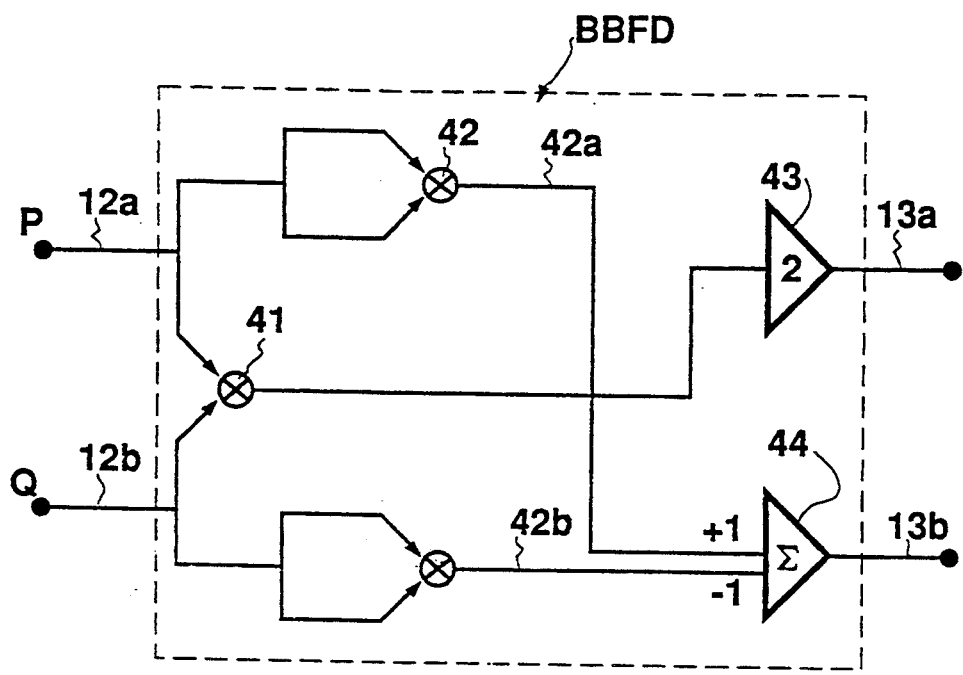
FIG. 5 illustrates a modulation wipe-off (MWO) circuit which is appropriate for BPSK modulation.

FIG. 5 illustrates an MWO circuit for binary phase shift keyed (BPSK) signals. In this case the quadrature signals are $$12a: \cos(\omega_I t + m_k \pi/2 + \tau) \quad (5)$$

$$12b: \sin(\omega_I t + m_k \pi/2 + \tau) \quad (6)$$

where $m_k$ takes on the values ±1 for different k's. The multiplier 41 followed by the amplifier 43, yield, at output 13a, twice the product of 12a with 12b:

$$\sin(2\omega_I t + m_k \pi + 2\tau) = -\sin(2\omega_I t + 2\tau) \quad (7)$$

whereas the dual-multipliers 42 with outputs 42a and 42b, followed by the adder 44, yield at output 13b:

$$\cos^2(\omega_I t + m_k \pi/2 + \tau) - \sin^2(\omega_I t + m_k \pi/2 + \tau) \quad (8)$$

$$= \cos(2\omega_I t + m_k \pi + 2\tau) \quad (9)$$

$$= -\cos(2\omega_I t + 2\tau). \quad (10)$$

It is thus seen that in the process the BPSK modulation has been wiped out, but the quadrature relation between the outputs 13a and 13b has been maintained and the frequency and phase have been doubled, thus earning the circuit the description Base Band Frequency Doubler (BBFD). This circuit conditions the signal for the proper operation of the Base Band Discriminator.

Figure 6:
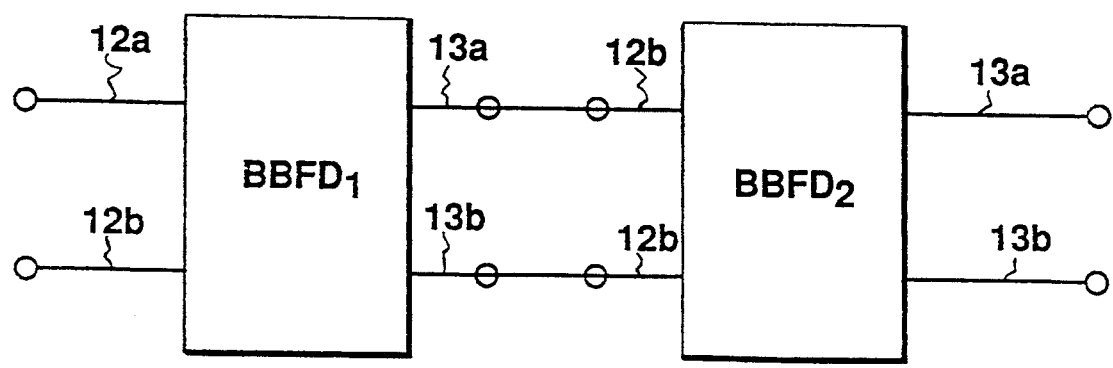
FIG. 6 illustrates two modulation wipe-off (MWO) circuits, each like FIG. 5 but cascaded for QPSK modulation.

In the case of QPSK, cascading two BBFD circuits wipes out the 90° modulation as well. This is shown in FIG. 6 at BBFD$_1$ and BBFD$_2$.

FIG. 7 illustrates a rather conventional Base Band Discriminator configuration in which the quadrature CW signals, properly conditioned by the MWO circuit, are low-pass filtered 60, differentiated 61, and cross multiplied 62 to yield, after addition 63, the output:

$$14a: \cos \omega_I t \cdot \omega_I \cos \omega_I t - \sin \omega_I t (-\omega_I \sin \omega_I t) = \omega_I$$

which is the desired result, proportional to the residual IF. The operation of the BBD would be hampered and rendered almost impossible were it not for the conditioning of the MWO circuits.

It will thus be seen that the modulation wipe-off effected by circuit MWO depends on the modulation type. For OOK modulation it is composed of two low-pass filters (LPF), one in each of the diversity branches at the output of the QM. For PSK modulation it is a base band frequency doubler (BBFD) circuit composed of voltage multiplier and adder components in such a configuration that their output signals have exactly the double phase of their input signals, even at vanishing values of the frequency deviation. It is thus seen that if the modulation is BPSK, the process of doubling the phase erases the modulation; and if the modulation is QPSK, the cascade of two BBFD's (FIG. 6) in effect quadruples the phase, and thus erases the modulation.

A BBFD circuit operating in accordance with the foregoing method can accept, at its two input ports, guadarature PSK signals down to zero frequency and outputs quadrature signals of exactly double frequency. The sign of the frequency is given by the polarity of the sine component when the latter is taken relative to the cosine component in the quadrature signals. The novel method and apparatus of the present invention thus provide advantages over the prior art, where the frequency controlled loops (e.g. for PSK signals) invariably perform the frequency doubling operations at an "offset" intermediate frequency (IF), incurring deterioration in performance because of this offset.

While the invention has been described with respect to several preferred embodiments, it will be appreciated that these are set forth purely for purposes of example, and that many other variations, modifications and applications of the invention will be apparent.

What is claimed is:

1. A method of producing a frequency-controlled loop in a phase-diversity receiver for demodulating received ON-OFF-keyed (OOK) and phase shift keying (PSK) signals, comprising the following operations:
   (a) generating a reference frequency signal;
   (b) feeding the reference frequency signal and the received signals to a quadrature mixer (QM) which produces two output signals in phase quadrature at nominally zero intermediate frequency;
   (c) producing from said phase quadrature output signals, quadrature continuous wave signals void of the modulation;
   (d) generating a voltage proportional to the frequency of the quadrature continuous wave signals;
   (e) and utilizing said generated voltage for controlling the frequency of the reference frequency signal generated in operation (a).

2. The method according to claim 1, wherein:
   said received signals are OOK signals;
   and said operation (c) is performed by passing the phase quadrature signals produced in operation (b) through a pair of low-pass filters.

3. The method according to claim 1, wherein:
   said received signals are binary phase shift keying (BPSK) signals;
   and said operation (c) is performed by a base-band-frequency-doubler (BBFD) circuit which transforms the BPSK signals into two pure continuous wave signals in quadrature relationship.

4. The method according to claim 1, wherein:
   said received signals are quaternary phase shift keying (QPSK) signals;
   and said operation (c) is performed by a first base-band-frequency-doubler (BBFD) circuit which transforms the QPSK signals into binary phase shift keying (BPSK) signals, and then by a second BBFD circuit which transforms the BPSK signals into two pure continuous wave signals in quadrature relationship.

5. The method according to claim 1, wherein said operation (d) is performed by a base-band-frequency-discriminator (BBD) circuit which, when fed with the two pure continuous wave signals in quadrature relationship, outputs a voltage proportional to their frequency.

6. The method according to claim 1, wherein, before operation (e) is performed, the voltage outputted in operation (d) is passed through a loop filter that smoothes out the output of operation (d).

7. A method of producing a frequency-controlled loop in a phase-diversity receiver for demodulating received ON-OFF-keyed (OOK) and phase shift keying (PSK) signals, comprising the following operations:
   (a) generating a reference frequency signal;
   (b) feeding the reference frequency signal and the received signals to a quadrature mixer (QM) which produces two output signals in phase quadrature at nominally zero intermediate frequency;
   (c) producing from said phase quadrature output signals, quadrature continuous wave signals void of the modulation;
   (d) generating a voltage proportional to the frequency of the quadrature continuous wave signals by a base-band-frequency-discriminator (BBD) circuit which, when fed with the two pure continuous wave signals in quadrature relationship, outputs a voltage proportional to their frequency;
   (e) and utilizing said generated voltage for controlling the frequency of the reference frequency signal generated in operation (a).

8. The method according to claim 7, wherein:
   said received signals are OOK signals;
   and said operation (c) is performed by passing the phase quadrature signals produced in operation (b) through a pair of low-pass filters.

9. The method according to claim 7, wherein:
   said received signals are binary phase shift keying (BPSK) signals;
   and said operation (c) is performed by a base-band-frequency-doubler (BBFD) circuit which transforms the BPSK signals into two pure continuous wave signals in quadrature relationship.

10. The method according to claim 7, wherein:
    said received signals are quaternary phase shift keying (QPSK) signals;
    and said operation (c) is performed by a first base-band-frequency-doubler (BBFD) circuit which transforms the QPSK signals into binary phase shift keying (BPSK) signals, and then by a second BBFD circuit which transforms the BPSK signals into two pure continuous wave signals in quadrature relationship.

11. Apparatus for producing a frequency-controlled loop in a phase-diversity receiver for demodulating received ON-OFF-keyed (OOK) and phase shift keying (PSK) signals, comprising:
    (a) a voltage controlled oscillator (VCO) for generating a reference frequency signal;
    (b) a quadrature mixer for receiving the reference frequency signal from the VCO, and the received OOK or PSK signals, and for producing two output signals in phase quadrature;
    (c) a Modulation Wipe-Off (MWO) circuit which receives said two output signals from the quadrature mixer and produces two quadrature continuous wave signals void of the modulation;
    (d) means for generating a voltage proportional to the frequency of the quadrature continuous wave signals outputted from the MWO circuit;
    (e) and means for utilizing said generated voltage for controlling the frequency of said VCO.

12. The apparatus according to claim 11, wherein:
    said received signals are OOK signals;
    and said MWO circuit includes a pair of low-pass filters which produce said continuous wave signals void of the modulation.

13. The apparatus according to claim 11, wherein:

said received signals are binary phase shift keying (BPSK) signals;

and said MWO circuit includes a base-band-frequency-doubler (BBFD) circuit which transforms the BPSK signals into two pure continuous wave signals in quadrature relationship.

14. The apparatus according to claim 11, wherein:

said received signals are quaternary phase shift keying (QPSK) signals;

and said MWO circuit includes:

a first base-band-frequency-doubler (BBFD) circuit which transforms the QPSK signals into binary phase shift keying (BPSK) signals, and a second BBFD which transforms the BPSK signals into two pure continuous wave signals in quadrature relationship.

15. The apparatus according to claim 11, wherein said means (d) includes a base-band-frequency-discriminator (BBD) circuit which, when fed with the two pure continuous wave signals in quadrature relationship, outputs a voltage proportional to their frequency.

16. The apparatus according to claim 11, wherein said means (e) includes a loop filter that smoothes out the output from means (d) before being utilized for controlling the frequency of said VCO.

17. The apparatus according to claim 11, wherein the quadrature mixer includes:

a three-port symmetrical coupler which outputs three mixed signals;

a three-phase detector generating a three-phase intermediate frequency signal spaced 120° apart;

and a three-to-two-phase converter producing two outputs from said three-phase intermediate frequency signal in phase quadrature at said intermediate frequency.

18. The apparatus according to claim 11, wherein said quadrature mixer includes:

a 90°-hybrid coupler which outputs two mixed signals;

and a two-phase detector which produces two outputs in phase quadrature.

* * * * *